United States Patent [19]

Balas et al.

[11] Patent Number: 5,239,010
[45] Date of Patent: Aug. 24, 1993

[54] SULFONATED BLOCK COPOLYMERS

[75] Inventors: Jaroslav G. Balas; William P. Gergen; both of Houston, Tex.

[73] Assignee: Shell Oil Company, Houston, Tex.

[21] Appl. No.: 820,446

[22] Filed: Jan. 10, 1992

Related U.S. Application Data

[63] Continuation of Ser. No. 198,543, May 24, 1988, abandoned.

[51] Int. Cl.$^5$ .................... C08F 297/04; C08F 8/36; C08F 8/44
[52] U.S. Cl. .................. 525/314; 525/332.4; 525/332.9; 525/333.5; 525/353; 525/366; 525/370
[58] Field of Search .................. 525/314, 332.4, 332.9, 525/333.5, 353, 366, 370

[56] References Cited

U.S. PATENT DOCUMENTS

| | | | |
|---|---|---|---|
| 3,577,357 | 5/1971 | Winkler | 525/314 |
| 3,642,728 | 2/1972 | Canter | 525/354 |
| 3,870,841 | 3/1975 | Makowski et al. | 525/344 |
| 4,127,546 | 11/1978 | Lundberg et al. | 524/274 |
| 4,492,785 | 1/1985 | Valint, Jr. et al. | 525/314 |
| 4,970,254 | 11/1990 | Willis et al. | 525/333.2 |

*Primary Examiner*—Vasu S. Jagannathan

[57] ABSTRACT

A thermoplastic polymer which possesses excellent mechanical properties at both room and elevated temperatures is obtained by reacting an acyl sulfate with a block copolymer composed of at least one conjugated diene block and one alkenyl arene block. The block copolymer is first selectively hydrogenated and thereafter modified by grafting sulfonic acid functional groups primarily in the alkenyl arene blocks. The mechanical properties may be varied and controlled by varying the degree of functionalization (amount of sulfonation), and the degree of neutralization of the sulfonic acid groups to metal sulfonate salts.

2 Claims, 1 Drawing Sheet

SULFONATED BLOCK COPOLYMERS

This is a continuation of application Ser. No. 07/198,543, filed May 24, 1988, now abandoned.

FIELD OF THE INVENTION

This invention relates to novel selectively hydrogenated functionalized block copolymers. More particularly, it relates to a novel block copolymer composed of a conjugated diene compound and an alkenyl arene compound with a sulfonic acid containing functional group or derivative thereof grafted primarily in the alkenyl arene block.

BACKGROUND OF THE INVENTION

It is known that a block copolymer can be obtained by an anionic copolymerization of a conjugated diene compound and an alkenyl arene compound by using an organic alkali metal initiator. Block copolymers have been produced which comprise primarily those having a general structure

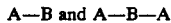

wherein the polymer blocks A comprise thermoplastic polymer blocks of alkenyl arenes such as polystyrene, while block B is a polymer block of a selectively hydrogenated conjugated diene. The proportion of the thermoplastic blocks to the elastomeric polymer block and the relative molecular weights of each of these blocks is balanced to obtain a rubber having unique performance characteristics. When the content of the alkenyl arene compound is small, the produced block copolymer is a so-called thermoplastic rubber. In such a rubber, the blocks A are thermodynamically incompatible with the blocks B resulting in a rubber consisting of two phases; a continuous elastomeric phase (blocks B) and a basically discontinuous hard, glass-like plastic phase (blocks A) called domains.

Since the A—B—A block copolymers have two A blocks separated by a B block, domain formation results in effectively locking the B blocks and their inherent entanglements in place between the A blocks and forming a network structure. These domains act as physical crosslinks anchoring the ends of many block copolymer chains while the copolymer is at a temperature below the glass transition temperature of the domains. The copolymer is easily processed while above the glass transition temperature of the domains which permits recycle of scrap unlike vulcanized or chemically cross-linked polymers. Such a phenomena allows the A—B—A rubber to behave like a conventionally vulcanized rubber in the unvulcanized state after melt processing and is applicable for various uses. For example, these network forming polymers are applicable for uses such as moldings of shoe sole, etc.; impact modifier for polystyrene resins and engineering thermoplastics; in adhesive and binder formulations; modification of asphalt; etc.

Conversely as the A—B block copolymers have only one A block, domain formation of the A blocks does not lock in the B blocks and their inherent entanglements. Hence, these diblock copolymers are referred to as non-network forming polymers. Moreover, when the alkenyl arene content is small resulting in a continuous elastomeric B phase, the strength of such polymers is derived primarily from the inherent entanglements of the various B blocks therein and to a much lesser extent the domain formation by the A blocks therein. However, the non-network forming polymers have found particular utility as viscosity index improvers (U.S. Pat. Nos. 3,700,748; 3,763,044; 3,772,196; 3,965,019; and 4,036,910). Non-network forming block copolymers are also utilized in adhesive and binder formulations and as modifiers or plasticizers for polystyrene resins and engineering thermoplastics (U.S. Pat. No. 4,584,338).

Network forming copolymers with a high alkenyl arene compound content, such as more than 70% by weight, provide a resin possessing both excellent impact resistance and transparency, and such a resin is widely used in the field of packaging. Many proposals have been made on processes for the preparation of these types of block copolymers (U.S. Pat. No. 3,639,517).

Both the network forming (A—B—A) and non-network forming (A—B) polymers may be handled in thermoplastic forming equipment and are soluble in a variety of relatively low cost solvents.

While in general these block copolymers have a number of outstanding technical advantages, one of their principal limitations lies in their sensitivity to oxidation. This behavior is due to the unsaturation present in the elastomeric section comprising the polymeric diene block. Oxidation may be minimized by selectively hydrogenating the copolymer in the diene block, for example, as disclosed in U.S. Pat. No. Re 27,145 and the above referenced VI improver patents. For example, prior to hydrogenation, the block copolymers have an A—B or an A—B—A molecular structure wherein each of the A's is an alkenyl-arene polymer block and B is a conjugated diene polymer block, such as an isoprene polymer block or a butadiene polymer block preferably containing 35-55 mole percent of the condensed butadiene units in a 1,2 configuration.

Non-network forming (A—B) block copolymers are especially deficient in applications in which good mechanical integrity and deformation resistance are required. This behavior is a consequence of the lack of inherent entanglements of the various B rubber blocks and to a much lesser extent the domain formation of the A blocks therein which controls strength under tensile deformation.

Additionally, these non-network forming copolymers, in particular A—B copolymers, are also deficient in viscosity index (VI) improver applications wherein thickening efficiency is lost at higher temperatures. As such, improvement in such properties may be achieved by enhancing the integrity of the alkenyl arene domains and the elastomeric matrix through the incorporation of interacting functional groups along the polymer chain.

Network forming copolymers are known to have particularly high tensile strengths at room temperature due to the formation of glassy phase arene block domains which act as physical crosslinks locking in the inherent entanglements within the rubbery B block matrix. The mechanical integrity of these domains and the resulting network structure appear to control the tensile strengths of these copolymers. Moreover, at elevated temperatures, the mechanical integrity of block copolymers is limited to the integrity of the hard phase arene block domains. For example, network forming copolymers having arene blocks of polystyrene have poor mechanical properties at high temperature which may be attributed to the weakening of the polystyrene domains above the polystyrene glass transition temperature (Tg) of 100° C. Improvements in the high temperature characteristics of the network forming block copolymers may be achieved by enhancing the integrity of the alkenyl arene domains to higher temperatures.

These selectively hydrogenated block copolymers are further deficient in many applications in which interactions are required between it and other materials. Applications in which improvements in adhesion characteristics may promote improved performance include 1) the toughening of, and dispersion in, polar polymers such as the engineering thermoplastics; 2) the adhesion to high energy substrates in a hydrogenated block copolymer elastomer based high temperature adhesive, sealant or coating material; and 3) the use of hydrogenated elastomers in reinforced polymer systems. The placement of functional groups onto the block copolymer may provide interactions not possible with hydrocarbon polymers and, hence, may extend the range of applicability of this material.

Many attempts have been made to improve adhesive characteristics, green strength and other properties by modifying block copolymers with acid compounds, particularly, network forming block copolymers having at least two A blocks and at least one B block. To this end, various methods have been proposed for modifying the polymer with carboxylic acid moieties, for example, Saito et al. in U.S. Pat. Nos. 4,292,414 and 4,308,353; Hergenrother et al. in U.S. Pat. No. 4,427,828; and Gergen et al. in U.S. Pat. No. 4,578,429 (K-4774). In each case, such modified block copolymers contain functional (acid) moieties only in the diene block and the functional site is not a sulfonic acid containing species. Specifically, Saito et al. and Hergenrother et al. attach anhydride moieties to a partially hydrogenated monovinyl arene/conjugated diene block copolymer by the so-called "ENE" reaction. Gergen et al. describe a block copolymer which is a thermally stable, selectively hydrogenated, high 1,2 content substituted vinyl arene/conjugated diene block copolymer grafted with at least one functional (anhydride) moiety at a secondary or tertiary carbon position via a free radical initiated reaction. However, such modified block copolymers do not take advantage of the arene block domain phenomena. Furthermore, the elastomeric properties of the polymer may be adversely altered by modifying or functionalizing the polymer B block.

U.S. patent application Ser. No. 07/079,380 teaches that substantial improvement in the high temperature capabilities of the block copolymer can be obtained by increasing the arene A block glass transition temperature (Tg), and by extending the mechanical integrity of the arene A block domains to higher temperatures. These performance characteristics are accomplished by grafting functional groups to the arene blocks, A, without substantially modifying the elastomeric B blocks. The high temperature properties are improved by grafting carboxyl functional groups in an all acid form, in a combination of their acid and neutralized metal carboxylate salt forms, or in an all neutralized metal carboxylate salt. Furthermore, the high temperature properties are also improved by increasing the degree of carboxyl functionality and/or by utilizing metal ions of increasing ionized valence states.

U.S. Pat. Nos. 3,642,953 and 3,870,841 describe the sulfonation of block copolymers having unsaturated blocks of butadiene rubber or isoprene. Sulfonation is preferential to the double bonds in the unsaturated rubber blocks. However, such modified block copolymers do not take advantage of arene block domain phenomenons and the elastomeric properties of the polymer may be adversely altered.

U.S. Pat. No. 4,614,765 describes a component of a molding composition that can be prepared by reacting a trifluoromethanesulfonyl compound with an A—B—A block copolymer that is selectively hydrogenated in the midblock to promote functionalization of the A blocks. The elastomer component preferably contains from about 15 to about 32 percent by weight of the sulfonyl containing compound.

U.S. Pat. No. 3,577,357, discloses a process for selectively grafting sulfonic acid containing radicals or their sulfonate derivatives to the arene blocks of an A—B—A block copolymer to improve water absorption properties. The midblocks B are hydrogenated prior to sulfonation to induce grafting on the arene blocks. Sulfonation with complexes of sulfurtrioxide and a trialkyl phosphate is disclosed.

SUMMARY OF THE INVENTION

According to the present invention, there is provided a thermally stable, selectively hydrogenated block copolymer to which a sulfonic acid containing functional group or its sulfonate derivative has been grafted primarily in the alkenyl arene block, and a process for manufacturing this block copolymer. Each of the alkenyl arene block domains are preferably ionically cross-linked within the separate domain by neutralizing from 0 percent to 100 percent, preferably from about 5 percent to about 100 percent, more preferably at least 50 percent, and most preferably at least 90 percent, of the sulfonic acid functional groups therein with metal ions of any positive valence, preferably mono-, di- or trivalent metal ions.

More specifically, there is provided a selectively sulfonated, selectively hydrogenated block copolymer which is produced by the process of:

(a) reacting an acyl sulfate and a block copolymer in a solvent, the block copolymer having at least one alkenyl arene polymer A block and at least one substantially completely hydrogenated conjugated diene block B, whereby sulfonic acid containing functional groups or their sulfonate derivatives are primarily grafted to the block copolymer on the A blocks, and (b) recovering the grafted block copolymer from the solvent.

The grafted sulfonic acid or sulfonate functional group is preferably present at between about an average of one functional group per A block and about an average of one functional group per aromatic ring of the A block. These functional groups may be in the form of sulfonic acids or salts. The sulfonate salts are preferably metal sulfonate salts, for example, sulfonate functional groups which are ionized with metal ions having a positive ionized valence state, preferably of from one to three inclusive. These metals ions may be selected from the group consisting of uncomplexed and complexed metal ions. These grafted functional groups may be in an all sulfonic acid form (—$SO_3H$) which corresponds to 0 percent neutralization or in an all sulfonate salt form (e.g. —$SO_3Na$) which corresponds to 100 percent neutralization, respectively; or in a combination of their sulfonic acid and sulfonate salt forms which corresponds to a partially neutralized state.

The functionalized block copolymer may be linear or branched, with the term "branched" also including symmetric or asymmetric radial and star structures.

Preferably, there is provided the functionalized selectively hydrogenated block copolymer as defined above, wherein (a) each of the A blocks prior to hydrogenation is predominantly a polymerized monoalkenyl monocyclic arene block having an average molecular weight of about 1,000 to about 125,000, preferably about 1,000 to about 60,000, (b) each of the blocks prior to hydrogenation is predominantly a polymerized conjugated diene block having an average molecular weight of about 10,000 to about 450,000, preferably about 10,000 to about 150,000, (c) the A blocks constitute between about 1 and about 99, preferably between about 2 and about 60, and more preferably between about 2 and 40 percent by weight of the copolymer, (d) the unsaturation of the B blocks is less than about 10 percent, preferably less than about 5 percent and more preferably at most 2 percent, of the original unsaturation of the B blocks, (e) the unsaturation of the A blocks is greater than about 50 percent, preferably greater than about 90 percent, of the original unsaturation of the A blocks, and (f) the sulfonic acid or sulfonate containing functional group is preferably present on the average from about one (1) of said functional groups per molecule of said copolymer to about one (1) of said functional groups per aromatic ring of said A block.

Focusing on the block copolymers of the present invention which contain sulfonic acid functional groups or their sulfonate salts in the arene blocks, research and experimentation have yielded unexpected and significant results. For example, utilizing an acetyl sulfate sulfonation scheme, these block copolymers have been found herein to exhibit superior and unexpected mechanical performance over block copolymers that are sulfonated as described in U.S. Pat. Nos. 3,577,357 and 4,614,765. These properties are improved by having the functional groups present as sulfonic acids, their sulfonate salts, or combinations thereof. Furthermore, these properties are also improved by increasing the degree of sulfonic acid or sulfonate salt functionality.

A feature of this invention lies in providing modified block copolymers which are thermally stable; have a low residual unsaturation; are processable in solution and/or in the melt; have improved mechanical properties at room temperature over its respective precursor (unmodified) block copolymer, such as tensile strength, and deformation resistance; etc.

Yet another feature of this invention lies in providing modified block copolymers which provide viscosity index improvement in lubricants and the like.

Accordingly, those and other features and advantages of the present invention will become apparent from the following detailed description.

DETAILED DESCRIPTION OF THE INVENTION

Selectively Hydrogenated Block Copolymer Base Polymer

Figure 1:
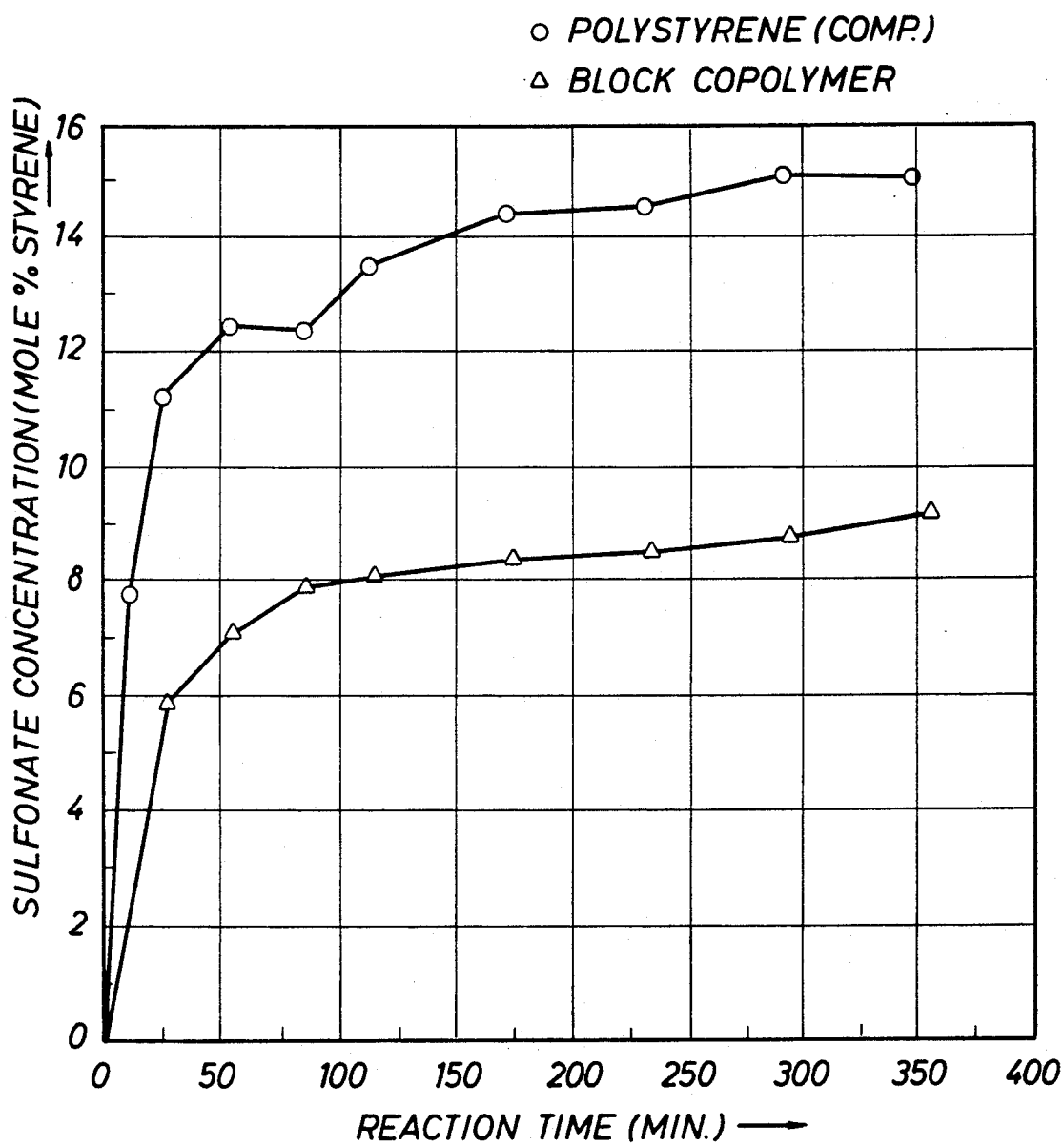
FIG. 1 compares the rate of sulfonation reaction of a hydrogenated butadiene-styrene triblock copolymer used in the present invention with that of a polystyrene sample used for comparison.

The block copolymers employed herein may have a variety of geometrical structures, since the invention does not depend on any specific geometrical structure, but rather upon the chemical constitution of each of the polymer blocks and of the coupling agents utilized. The block copolymers employed in the present composition are thermoplastic elastomers and have a least one alkenyl arene polymer block A and at least one elastomeric conjugated diene polymer block B. The number of blocks in the block copolymer is not of special importance and the macromolecular configuration may be linear or branched, which includes graft, radial or star configurations, depending upon the method by which the block copolymer is formed. The radial or star configuration may be either symmetric or asymmetric.

Typical examples of the various structures of the precursor block copolymers used in the present invention are represented as follows:

(A—B)n (A—B)nA (B—A)nB

[(A—B)p]mX (B—A)p]mX

[(A—B)pA]mX and

[(B—A)pB]mX wherein A is a polymer block of an alkenyl arene, B is a polymer block of a conjugated diene, X is a residual group of a polyfunctional coupling agent having two or more functional groups, n and p are independent integer suhscripts of 1 to 20 and m is an integer subscript of 2 to 20. Furthermore, the above-mentioned branched configurations may be either symmetrical or asymmetrical with respect to the blocks radiating from X.

The A blocks are preferably monoalkenyl arene. The term "monoalkenyl arene" will be taken to include particularly those of the benzene series such as styrene and its analogs and homologs including alpha-methylstyrene and ring alkylated styrenes, particularly ring-methylated styrenes, and other monoalkenyl polycyclic aromatic compounds such as vinyl naphthalene and the like. The preferred monoalkenyl arenes are styrene and alpha-methylstyrene and styrene is particularly preferred.

The conjugated dienes are preferably ones containing from 4 to 8 carbon atoms. Examples of suitable such conjugated diene monomers include: 1,3-butadiene (butadiene), 2-methyl-1,3-butadiene (isoprene), 2,3-dimethyl,3-butadiene, and piperylene, preferably butadiene and isoprene. Mixtures of conjugated dienes may also be used.

The blocks A may be either a homopolymer or a random or tapered copolymer of the monalkenyl arenes, and may contain some of the hydrogenated conjugated diene monomers so long as the monoalkenyl arene monomers predominate.

The blocks B may be either a homopolymer or a random or tapered copolymer of the hydrogenated conjugated dienes, and may contain some of the monalkenyl arene monomers so long as sulfonation occurs primarily in the A blocks.

The preferred base block copolymers have demonstrated utility in the present invention and have the structures:

polystyrene-hydrogenated polybutadiene-polystyrene (S-EB-S), and polystyrene-hydrogenated polyisoprene (S-EP)

Preferably, the block copolymers of conjugated dienes and alkenyl arenes which may be utilized include any of those materials which have 1,2-microstructure contents prior to hydrogenation of from about 7% to about 100%, preferably from about 25 to about 65%, more preferably 35 to 55%. Such block copolymers may contain various ratios of conjugated dienes to alkenyl arenes. The proportion of the alkenyl arene blocks is between about 1 and about 99 percent by weight of the multiblock copolymer. To exhibit elastomeric properties, the proportion of the alkenyl arene blocks in these block copolymers is between preferably about 2 and about 65 percent, and more preferably between about 5 and about 40 percent by weight. When the alkenyl arene content is not more than about 60 percent by weight, preferably not more than about 55 percent by weight, the precursor block copolymer has the characteristics of a thermoplastic elastomer. When the alkenyl arene content is greater than about 60 percent by weight, preferably more than about 70 percent by weight, the precursor block copolymer has the characteristics of a resinous polymer.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 11,000 to about 150,000. These molecular weights are most accurately determined by gel permeation chromatography and/or low angle light scattering techniques.

The block copolymer may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,888 and 4,219,627. As is well known in the block copolymer art, tapered copolymer blocks can be incorporated in the multiblock copolymer by copolymerizing a mixture of monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference. Additionally, various patents describe the preparation of symmetric and asymmetric radial and star block copolymers including U.S. Pat. Nos. 3,231,635; 3,265,765; 3,322,856; 4,391,949; and 4,444,953; the disclosures of which patents are incorporated herein by reference.

Though the afore-mentioned illustrative patents are slanted to producing network forming block copolymers (e.g. A—B—A), the non-network forming block copolymers of the present application may also be prepared by an obvious variation or modification of these procedures; for example 1) sequential polymerization of an A—B or B—A—B block copolymer; 2) utilizing a di-initiator to prepare a B—A—B block copolymer; 3) utilizing polyfunctional coupling agents to couple B—A—Li living copolymer segments to form a $(B-A)_n X$ polymer, where X is the residual portion of the polyfunctional coupling agent incorporated as part of the polymer whose presence therein is of insignificant effect to the properties of the resulting polymer and where n is the number of block copolymer segments or arms attached to X; and 4) similarly utilizing polyfunctional coupling agents to couple B—A—Li living copolymer segments and B—Li living homopolymer or diene copolymer segments to form a $(B-A)_y X (B)_z$ polymer, where X is as before and y and z represent the number of respective segments or arms attached to X.

These polymers and copolymers are preferably hydrogenated to increase their thermal stability and resistance to oxidation. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of not more than about 20 percent, preferably less than about 10 percent, more preferably less than about 5 percent, and yet more preferably at most about 2 percent, of their original unsaturation content prior to hydrogenation.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

Sulfonated Block Copolymers

The hydrogenated block copolymers described above are sulfonated primarily in the alkenyl arene blocks according to the present invention by reaction with a sulfonation reagent that selectively sulfonates the aklenyl arene blocks in preference to the hydrogenated polydiene blocks. Acyl sulfates exhibit the desired preference for sulfonation of the aklenyl arene blocks as discussed in more detail below. Although complete sulfonation of the small residual unsaturation in the polydiene blocks may occur, sulfonation will be discussed primarily as it relates to the alkenyl arene blocks. Acyl sulfates are known in the art as described in U.S. Pat. No. 3,870,841, which relates to sulfonation of double bonds in polymers that contain unsaturated polydiene blocks and as used to sulfonate polystyrene. Exemplary reactions for the present invention are given below:

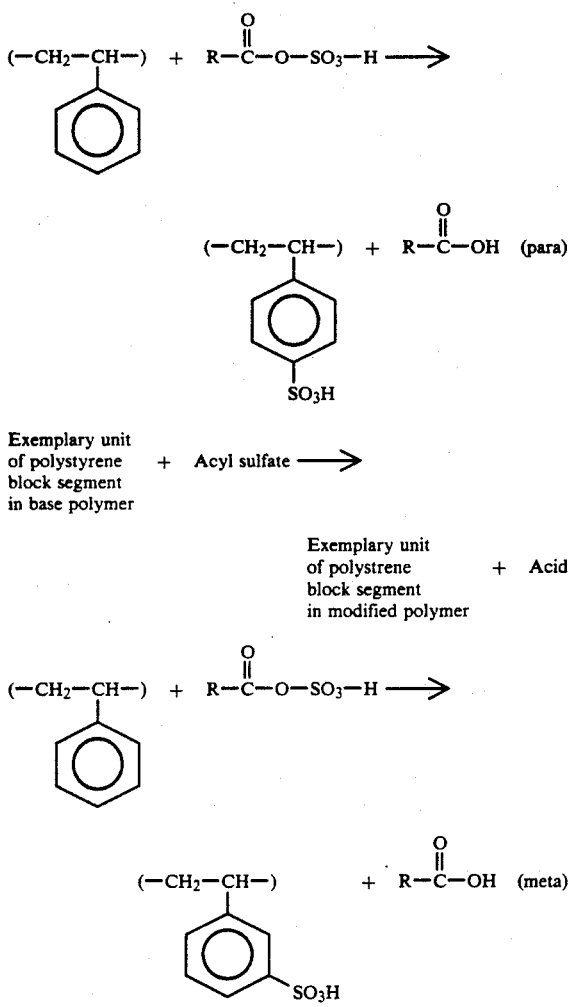

Exemplary unit of polystyrene block segment in base polymer + Acyl sulfate ⟶

Exemplary unit of polystrene block segment in modified polymer + Acid

Where: R is an alkyl group. The preferred sulfonating reagent is "acetyl sulfate" for which R is a methyl group.

The structure of the substituted block copolymer specifically determined by the location of the sulfonic acid group (—SO₃H) on the alkenyl arene block gives the block copolymer a substantially greater degree of thermal stability.

The quantity of molecular units containing sulfonic acid or sulfonate functional groups in the modified block copolymer is dependent on the content and the aromatic structure of the alkenyl arene therein. Once these parameters are fixed, the number of such groups present is dependent on the degree of functionality desired between a minimum and maximum degree of functionality based on these parameters. The minimum degree of functionality corresponds on the average to at least about one (1), preferably at least about three (3) sulfonic acid or sulfonate groups per molecule of the block copolymer. It is presently believed that the addition of about one (1) sulfonic acid or sulfonate group per aromatic ring of the A blocks is limiting. Preferably the functionality level is on the average from about one (1) functional group per molecule of the copolymer to about one functional group per aromatic ring of the A block, and more preferably on the average from about three (3) functional groups per molecule of the copolymer to about one (1) functional group per two aromatic rings of the A block.

Preferred sulfonation reagents for preparing the sulfonated block copolymers described herein are "acyl sulfates". The preparation and characterization of acyl sulfates is described in "Sulfonation and Related Reactions", E. E. Gilbert, Robert E. Krieger Publishing Co., Inc., Huntington, NY, pp 22, 23, and 33 (1977) (First edition published by John Wiley & Sons, Inc (1965)). Acetyl sulfate is the most preferred sulfonation reagent. Acetyl sulfate (CH₃—CO—O—SO₃H) is capable of sulfonating itself to produce sulfo-acetic acid (HSO₃—CH₂—CO—OH), and should be prepared fresh before each sulfonation reaction. Alternatively, it may be prepared in situ by the following reaction of acetic anhydride with sulfuric acid:

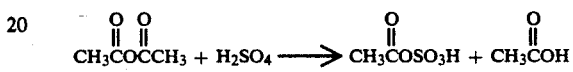

It is preferably to separately prepare the acetyl sulfate with an excess of acetic anhydride in case any water is present in the reactant solution. Water might inadvertently be present as a consequence of using wet solvent(s) or improperly dried polymer. Such inadvertently added water would be expected to decompose the acetyl sulfate according to the following reaction:

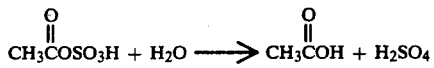

Excess acetic anhydride in the acetyl sulfate reagent would be expected to scavenge traces of water according to the following reaction:

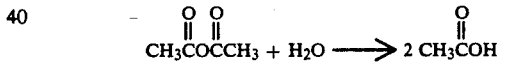

In this way, reaction poisons could be removed from the sulfonation medium.

Several variations of an acetyl sulfate reaction technique were employed in preparing the sulfonated block copolymer of the present invention. The unmodified block copolymers used in these preparations are described in Table 1. As appropriate, sulfonic acid modified block copolymers were neutralized with sodium hydroxide and zinc acetate to afford, respectively, sodium sulfonate and zinc sulfonate modified block copolymers. Specific polymers were prepared as outlined in the examples below.

Neutralization of Modified Block Copolymer

The sulfonic acid functional groups in the A blocks of the block copolymers of the present invention are preferably "neutralized" by reacting the modified block copolymer with an ionizable metal compound to obtain a metal salt. The reaction mechanism involved in the formation of the ionic A block domains and the exact structure of these ionic clusters within the respective domain is not completely understood at the present time. However, it is believed that increased high temperature properties of these ionic copolymers are the result of an ionic attraction between the metal ion and one of more ionized sulfonate functional groups in the A block domains.

This ionic attraction results in a form of crosslinking which occurs in the solid state. However, when molten and subjected to the shear stresses which occur during melt fabrication, the ionic crosslinks with these A blocks of the copolymers of the present invention weaken and the polymer exhibits melt fabricatability. Moreover, these ion containing block copolymers are readily soluble in polar solvents and may be processed easily from solution. During cooling of the melt or during solvent evaporation, the ionic crosslinks are reformed or strengthened as the modified block copolymer solidifies and again exhibits the properties of a crosslinked material.

The improvement in the mechanical properties and deformation resistance resulting from the neutralization of the ionic A block domains is greatly influenced by the degree of neutralization and, therefore, the number of the ionic crosslinks and the nature of the crosslink involved. As earlier noted, an improvement in these properties over that of the unmodified block copolymer occurs when the sulfonic acid functional groups are added to the block copolymer. A further enhancement in properties results as the degree of neutralization of the sulfonic acid groups increases from 0 percent to 100 percent of total functionality content. Thus, as the degree of sulfonic acid functionality and metal sulfonate salt content are independently or jointly increased, a greater improvement in the high temperature properties of the modified block copolymer is observed. This phenomena is true so long as the sulfonated block copolymer remains processable from the solution or melt state. Additionally, the viscosity index improvement produced by these polymers in lubricants and the like is also enhanced and rendered more stable as a result of these ionic attractions.

The metal ions which are suitable in forming the neutralized block copolymers of the present invention are positive valent ions of metals preferably mono-, di- and trivalent ions of metals in Groups IA, IB, IIA, IIB, IIIA, IIIB, and VIII, of the Periodic Table of Elements. These metal ions can be complexed or uncomplexed, and can be used alone or in any mixture thereof. Suitable divalent metal ions are $Na^+$, $K^+$, $Li^+$, $Cs^+$, $Ag^+$, $Hg^+$ and $Cu^+$. Suitable divalent metal ions are $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$ and $Zn^{+2}$. Suitable trivalent metal ions are $Al^{+3}$, $Sc^{+3}$, $Fe^{+3}$, $La^{+3}$, and $Y^{+3}$. Preferable compounds are hydroxides, oxides, alcoholates, carboxylates, formates, acetates, methoxides, ethoxides, nitrates, carbonates and bicarbonates of (he above-referenced metal ions.

The degree of sulfonation and of neutralization may be measured by several techniques. For example, infrared analysis or elemental analysis may be employed to determine the overall degree of functionality. Additionally, the titration of a solution of the block copolymer with a strong base may be utilized to determine the degree of functionality and/or the degree of neutralization (metal sulfonate salt content) Neutralization as used herein is based on the percentage of sulfonate ions as compared to the total sulfonic acid and sulfonate group functionality.

In general, it was found that the added metal ions react approximately stoichiometrically with the sulfonic acid functional groups (acid form) in the polymer up to about 95 percent neutralization. Thereafter, excess quantities of the metal compound are necessary to carry the neutralization to completion. However, in some instances, an excess of the neutralizing agent may be desirable.

The block copolymers, as modified, may still be used for any purpose for which the unmodified material (base polymer) was formerly used. That is, they may be used for adhesives and sealants, as modifiers for lubricants, fuels and the like, or compounded and extruded and molded in any convenient manner.

The desired degree of neutralization may be achieved by various methods. If the modified block copolymer is in an all acid form or in a partially neutralized form and additional neutralization is desired, neutralization is preferably carried out under conditions which allow for a homogeneous uniform distribution of the metal compound in the modified block copolymer. No particular reaction conditions are essential except that the conditions should preferably permit the removal of the neutralization product. More specifically, the neutralization reaction is preferably carried out either (1) by adding the metal compound, directly or in solution, to a solution of the modified block copolymer and then, on neutralization, precipitating and separating the resulting polymer; or (2) by melt blending the block copolymer with the metal compound. The melt blending is preferably conducted at elevated temperatures to facilitate homogeneous distribution of the metal compound and to volatize the neutralization product.

Alternatively, if the modified block copolymer is in an all neutralized salt form or in a partially neutralized form and additional acidification (i.e., reverse-neutralization) is desired, acidification is likewise preferably carried out under conditions which allow for a homogeneous uniform distribution of the acid in the modified block copolymer. The acid utilized is preferably a mineral acid such as sulfuric acid or hydrochloric acid. The resulting metal-salt acidification product is not believed to be harmful to the resulting modified block copolymer. However, the metal salt may be removed by conventional means if so desired.

As an additional alternative, the all acid and the all neutralized salt forms of the block copolymer may be blended with each other, by either the solution or melt blending method mentioned above, to achieve the desired degree of neutralization. It is to be understood, however, that the specific technique employed is not critical as long as it meets the requirements set forth above. The extent of the neutralization, i.e., the degree to which (he metal ion is linked with the sulfonate ion may be readily analyzed by titration methods.

It is not essential that the metal compound be added as such, but it is Possible to form the metal compound in situ from components which react with each other in the desired manner in the polymer environment. Thus, it is possible to add a metal oxide to the acid or partially neutralized block copolymer then add an acid such as acetic acid in the proper proportion and form the metal compound, i.e., the metal acetate, while the polymer is milled The metal compound then neutralizes the block copolymer to the desired degree depending on (he proportion of metal compound formed.

Copolymer Blends

The polymer compositions of the present invention can also contain thermoplastic polymers which are not reactive with the modified block copolymer, and which are preferably non-polar, such as styrene polymers and olefin polymers, as a separate phase therein. These thermoplastic polymers can optionally be incorporated into the present polymer compositions to improve the processability of the composition without substantially detracting from the essential character of the modified block copolymer therein. The amount of the non-reactive thermoplastic polymer is preferably 100 parts by weight or less, more preferably 1 to 50 parts by weight based on 100 parts by weight of the modified block copolymer.

The styrene polymers are polymer substances containing 50% by weight or more of styrene, such as polystyrene, styrene-α-methylstyrene copolymers, butadiene-styrene block copolymers and hydrogenated derivatives thereof, isoprene-styrene block copolymers and hydrogenated derivatives thereof, rubber modified high impact polystyrene, and mixtures thereof.

The olefin polymers are polymer substances containing 50% by weight or more of an olefin monomer unit containing ethylene, propylene butene and the like. Typical examples of such polymers are low-density polyethylene, high density polyethylene, polypropylene, polybutene, ethylene-propylene copolymers and the like, including mixtures thereof.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

APPLICATIONS

The compositions of the present invention can be molded or formed into various kinds of useful articles by using conventional molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes. These articles can be used in the fields of, for example, automobile parts, electrical parts, mechanical parts, footwear, medical equipment and accessories, packaging materials, building materials and the like.

The sulfonated block copolymers can be solution cast into articles having no thermal stresses. In general, the sulfonated polymers were difficult to mold; the difficulty increased with increasing sulfonation. At the higher sulfonate levels, it was difficult to make good films. Compression molded films possessed a high level of molded-in stresses. Annealing the molded films overnight in a vacuum oven near the glass transition temperature between spring loaded parallel plates was adequate for relieving the bulk of the residual stresses. If this were not done, the samples shrank at elevated temperatures. These observations can be attributed to the network formed by the ionic associations since this problem did not occur for the unsulfonated block copolymer.

EXAMPLES

To assist those skilled in the art in the practice of this invention, the following Examples are set forth as illustrations and should not be construed as limiting the invention. It is understood that in the specification and claims herein, unless otherwise indicated, when amounts are expressed in terms of percent by weight, it is meant percent by weight based on the block copolymer. When amounts are expressed in terms of mole percent (mol %), it is meant mole percent basis styrene content of the polymer; for example, 10 mole percent sulfonate would indicate 10 sulfonate moieties per 100 styrene units in the block copolymer. It is to be understood that in the tables that follow where reference is made to "counterion" only the metal counterion will be listed with respect to the partially neutralized modified block copolymers with the hydrogen counterion relating to the remaining acid functionally being implied.

The base (unmodified) block copolymers used in the examples are the polystyrene-poly(ethylene/butylene)-polystyrene (S—EB—S) block copolymers and the polystyrene-poly(ethylene/propylene) (S—EP) block copolymers shown in Table 1. The base block copolymers are the products of selectively hydrogenating either a polystyrene-polybutadiene-polystyrene (S—B—S) or polystyrene-polyisoprene (S—I) block copolymer effected by use of a catalyst comprising the reaction products of an aluminum alkyl compound with nickel carboxylates. The base block copolymers have a residual ethylenic unsaturation of less than about 2% of the original unsaturation in the polybutadiene block and have a residual aromatic unsaturation of greater than 95% of the original unsaturation in the polystyrene block.

TABLE 1

| Base Block Copolymer | Styrene Content (wt %) | Block Styrene Content (wt %) | Total MW | Block Structure[1] and Block MW |
|---|---|---|---|---|
| A | 30 | 30 | 50,100 | (S—EB—S) 7,500-35,100-7,500 |
| B | 30 | 30 | 50,000 | (S—EB—S)[2] |
| C | 39 | 39 | 105,000 | (S—EP) 40,500-64,700 |

[1] S - Polymer block composed chiefly of styrene
EB - Polymer block composed chiefly of hydrogenated polybutadiene and referred to as ethylene/butylene
EP - Polymer block composed chiefly of hydrogenated polyisoprene and referred to as ethylene/propylene
MW - Number average molecular weight
[2] MW targets were same as outlined for base block copolymer A. Polymers A and B were from separate polymerization and hydrogenation experiments. Both were prepared using the same procedures and are believed to be essentially identical materials.

Per the following examples, the base block copolymer was first modified to varying degrees of sulfonic acid group functionality (content) by reacting acetyl sulfate with polystyrene blocks. The modified block copolymers were then further modified with sodium and zinc metals to form carboxylate salts at various acid to sulfonate salt contents (degree of neutralization). Films were compression molded for dynamic mechanical analysis and tensile strength measurements.

All dynamic mechanical analyses were done as a Rheometrics System 4 mechanical spectrometer. For tension, the linear motor and rectangular film specimens were used over the entire temperature range covered, about 30°–210° C. The dynamic motor was used, and above Tg, the samples were approximately 1 mm disks between oscillating parallel plates. A frequency of 1 Hz was used in all the experiments, and the strain was chosen so as to be within the linear range of the material response, as judged from strain sweeps at constant frequency and temperature. Temperature was controlled with ±1° C. in a forced air convection oven. The thermocouple was in contact with the upper plate in the parallel plate geometry and near, but not touching, the specimen when films were used. The auto-tensioning capability of the instrument was used for the tensile experiments.

Tensile measurements were made on micro-tensile specimens cut from compression molded films on an Instron Universal Testing Machine. A cross head speed of 0.5 inches/minute was employed over a gauge length of 1 inch. Samples tested at elevated temperatures were not preconditioned at the elevated temperatures.

Compression set measurements were conducted in accordance with method B of ASTM 395-85 using polymer disks that were made from compression molded films and were not injection molded. The polymer films were 40 mil in thickness and were stacked to the required thickness.

EXAMPLE 1

Sulfonation of a Styrene-Hydrogenated Butudiene-Styrene Triblock Copolymer (Preferred Method)

In this experiment, a standard solution of acetyl sulfate was prepared by treating 7.6 ml (81 mmol) of acetic anhydride in 40 ml of 1,2-dichloroethane (EDC) at 10° C. with 2.8 ml (50 mmol) of 95% sulfuric acid ($H_2SO_4$). A clear solution resulted. The solution was presumed to be 1.0 M in acetyl sulfate.

Base block copolymer A was dried in a vacuum oven at 70° C. for 48 hrs to remove traces of water. An aliquot of the dried polymer (10 g) was dissolved in EDC (100 ml) in a closed vessel and the solution was heated to 50° C. The sample was sparged with nitrogen for 30 minutes to remove atmospheric oxygen. Sulfonation was initiated by the addition of 6 ml (6 mmol) of the 1.0 M standard acetyl sulfate solution. After 2 hours, the reaction was terminated by addition of a quenching agent, 2-propanol (10 ml). The sulfonic acid modified block copolymer was isolated by a steam stripping technique. The crude product was purified by washing in boiling water for 2 hours. Purified polymer was recovered by filtration. The filter cake was washed with absolute ethanol and vacuum dried at 50° C. for 5 days.

A quantitative yield of modified polymer was recovered.

Elemental analysis of an aliquot of the modified polymer found 1.04% wt sulfur (11.7 mol % sulfonic acid based on the styrene content of the polymer (i.e. 11.7 —$SO_3H$ sites per 100 styrene units in the block copolymer)). The theoretical yield for this reaction was 21 mol % sulfonic acid based on the styrene content of the polymer. On the basis of elemental analysis results, about 56% of the $H_2SO_4$ used in preparing the acetyl sulfate charge resulted in forming polymer bound sulfonic acid sites in the modified polymer.

A second aliquot of the modified polymer was analyzed for sulfonic acid content using a titration technique. In this analysis, an accurately weighed sample of the purified sulfonated polymer (about 0.1 g) was dissolved in 50 ml of a toluene/methanol (90/10, v/v) solution. Nitrogen was bubbled through the solution for 30 minutes to purge the sample of dissolved $CO_2$. Titration to a phenolphthalein endpoint using 0.02N NaOH in methanol found 11.9 mol % sulfonic acid based on the styrene content of the polymer. This result was in good agreement with the value found by elemental analysis, 11.7 mol%.

Using this reaction procedure with varying levels of sulfonation reagent, a variety of sulfonic acid modified polymers were synthesized from base block copolymer A. These products correspond to Polymers MA1–MA5 in Table 2.

Sodium ($Na^+$) and zinc ($Zn^{2+}$) salts of these polymers were prepared by dissolving the sulfonic acid modified polymer in a toluene/methanol mixture and treating the solution with an excess (about 10 mol %) of a concentrated aqueous solution of NaOH (for the $Na^+$ salt) or $Zn(OAC)_2$ (for the $Zn^{2+}$ salt).

The product sulfonate salt modified polymers were isolated and characterized as described in Table 3. Complete conversion to the sulfonate salt form was assumed without supporting analytical data.

TABLE 2

| Modified Block Copolymer | Base Block Copolymer | Sulfonic Acid Functionality (mol % basis styrene) | Sulfonation Reagent | Sulfonation Technique (Example #) | Ratio of Sulfonic Acid Groups to Alkenyl Arene Units in Block Copolymer | Sulfonic Acid Groups/Molecule of Block Copolymer |
|---|---|---|---|---|---|---|
| MA1 | A | 2.5 | Acetyl Sulfate | 1 | 1/40 | 3.6 |
| MA2 | A | 5.2 | Acetyl Sulfate | 1 | 1/19 | 7.5 |
| MA3 | A | 8.7 | Acetyl Sulfate | 1 | 1/11 | 13 |
| MA4 | A | 11.0 | Acetyl Sulfate | 1 | 1/9 | 16 |
| MA5 | A | 11.9 | Acetyl Sulfate | 1 | 1/8 | 17 |
| MA6 | A | 8.3 | Acetyl Sulfate | 2 | 1/12 | 12 |
| MA7 | A | 13.0 | Acetyl Sulfate | 2 | 1/8 | 19 |
| MA8 | A | 13.9 | Acetyl Sulfate | 2 | 1/7 | 20 |
| MA9 | A | 18.5 | Acetyl Sulfate | 2 | 1/5 | 27 |
| MA10 | A | 23.0 | Acetyl Sulfate | 2 | 1/4 | 33 |
| MB1 | B | 10.6 | Acetyl Sulfate | 1 | 1/9 | 15 |
| MB2 | B | 10 | $SO_3$/Triethyl phosphate | 3 | 1/10 | 14 |
| MC1 | C | 2.4 | Acetyl Sulfate | 4 | 1/42 | 9 |
| MC2 | C | 3.2 | Acetyl Sulfate | 4 | 1/31 | 12 |

EXAMPLE 2

Sulfonation of a Styrene-Hydrogenated Butadiene-Styrene Triblock Copolymer (Preferred Method)

The procedures of Example 1 were modified slightly resulting in the generation of a second family of sulfonic acid and sulfonate salt modified block copolymers. This procedure relied upon an acetyl sulfate reagent which contained excess sulfuric acid (H₂SO₄) rather than excess acetic anhydride as was used in Example 1.

The sulfonation reagent( was prepared by combining 21.6g (0.212 mol) of acetic anhydride in 320 ml of methylene chloride (CH$_2$Cl$_2$) at 10° C. with 36.7g (0.360 mol) of 96.1%wt sulfuric acid (which contained 1.4g (0.078 mol) H$_2$O). Assuming that 0.078 mol of acetic anhydride were consumed in reaction with the water in the H$_2$SO$_4$, the clear, colorless acetyl sulfate solution contained 0.134 mol of sulfonation reagent plus excess sulfuric acid.

A solution of base polymer A (147g) in cyclohexane (720g) was heated in a glass reactor under an inert nitrogen atmosphere to 40° C. Further dilution with 1,2 dichloroethane (EDC) (1104g) afforded a reactant polymer cement at 7.5% wt polymer. The acetyl sulfate solution was added with stirring. After reaction for 4 hours at 40° C., the sulfonation reaction was quenched by the addition of 30ml of H$_2$O.

The quenched, sulfonated polymer solution was neutralized by pouring it slowing into an excess of an aqueous sodium hydroxide solution (116g NaOH, 2.9 mol, in 2895 ml). The resulting 2-phased mixture was stirred in a Waring Blender for 20 min. The crude reaction product was poured into an equal volume of hot (95° C.) water. Evaporation of the organic solvents left a rubbery polymer gel floating on top of the hot water. The crude polymer product was chopped in a Waring Blender with 1700 ml of water, filtered and washed with additional aliquots (6 total) of water until the water wash was free of sulfate ions (SO$_4^{2-}$) (as assayed by the addition of a few drops of a 2% wt BaCl$_2$ in water solution) and at a neutral pH. Entrained water was removed by washing the final filter cake with methanol.

The purified polymer was dried in a vacuum oven (45° C.) to a constant weight (6 hours) affording 148.5g of a tan colored polymer crumb, Polymer MA9. Elemental analysis of the dried polymer found 1.71% wt Sulfur; this corresponded to 18.5 mol % sulfonyl functional sites based on the styrene content of the polymer (theoretical yield, allowing for the water present in the sulfonation reagents, was 20.6 mol %). Elemental analysis of the polymer for Na found 1.33 wt %; this amounted to 1.08 moles of Na per mole of sulfonate species in the polymer. These data were taken as evidence that the polymer was slightly over-neutralized by about 8 mol %. Clearly all of the polymer bound sulfonic acid species had been converted to polymer bound sodium sulfonate (—SO$_3$Na) species; the excess sodium ions were likely present as hydroxides.

By adjusting the ratio of reactant polymer, base block copolymer A, to acetyl sulfate reagent, a series of polymers were prepared using the method described above. These polymers are described in Table 2 as Polymers MA6–MA10.

EXAMPLE 3

Preparation of a Control Polymer Using a Sulfur Trioxide/Phosphate Technique (Comparison Method)

A sample of base polymer B was sulfonated using a sulfur trioxide/triethyl phosphate reagent as described in U.S. Pat. No. 3,577,357. The product was neutralized using the method outlined in Example 2. Elemental analysis of the purified polymer found 10 mol % —SO$_3$Na based on the styrene content of the polymer. This polymer was completely neutralized, it contained no excess —SO$_3$H, and it contained no excess Na$^+$ salts. The product is Polymer MB2 in Table 2.

EXAMPLE 4

Sulfonation of a Styrene-Hydrogenated Isoprene Diblock Copolymer (Preferred Method)

The method of Example 2 was employed in this experiment. Instead of base polymer A, base polymer C (110 g) was used. A lesser amount of the sulfonation reagent (2.7g of 96.1% H$_2$SO$_4$ (0.026 mol) and 6.6g of acetic anhydride (0.065 mol); excess acetic anhydride) afforded a polymer with a lower sodium sulfonate (—SO$_3$Na) content (3.2 mol % based on the polystyrene content of the polymer). This polymer salt was over neutralized as well (about 86 mol % excess Na$^+$ ions). This material was labeled Polymer MC2.

A repeat of this experiment with less sulfonating agent gave Polymer MC1 in Table 2.

EXAMPLE 5

Reaction Kinetics For the Sulfonation of a Styrene-Hydrogenated Butudiene-Styrene Triblock Copolymer (Preferred Method)

Using the sulfonation method described in Example 1, a kinetic experiment was performed to measure the rate of the sulfonation reaction. The reaction was increased in size by 50% to accommodate the need for several analytical samples and employed 15g of base polymer A, 150 ml of EDC, and 7.2 mmol of acetyl sulfate reagent. As outlined in Example 1, the reaction was conducted at 50° C. Ten ml aliquots of the reaction mixture were removed after 30, 60, 90, 180, 240, 300, and 360 minutes. The polymer was immediately recovered from each aliquot by steam stripping and was subsequently washed in boiling water, washed with absolute methanol, and vacuum dried. The sulfonic acid concentration of each polymer aliquot was determined by titration. The results of this study are presented in FIG. 1. The sulfonation level increased rapidly up to about 2 hours and after that it increased very slowly. The conversion after 6 hrs was about 50%.

EXAMPLE 6

Neutralized Modified Block Copolymers

In this example, sulfonated block copolymers were neutralized utilizing monovalent metal counterions such as sodium (Na$^{1+}$) and lithium (Li$^{1+}$) and divalent metal counterions such as zinc (Zn$^{2+}$). The neutralized modified block copolymers were obtained by adding aqueous sodium hydroxide, lithium hydroxide and zinc acetate solutions to the sulfonated block copolymer (all acid) in toluene respectively.

Table 3 indicates the various neutralized block copolymers produced from the corresponding modified block copolymers for purposes of the following examples.

TABLE 3

| Modified Block Copolymer | Precurser Block Copolymer | Sulfonic Acid Functionality mol % | Metal Counterion[a] |
|---|---|---|---|
| MA11 | MA1 | 2.5 | Na |
| MA12 | MA1 | 2.5 | Zn |
| MA21 | MA2 | 5.2 | Na |
| MA22 | MA2 | 5.2 | Zn |
| MA31 | MA3 | 8.7 | Na |
| MA32 | MA3 | 8.7 | Zn |
| MA41 | MA4 | 11.0 | Pb |

TABLE 3-continued

| Modified Block Copolymer | Precurser Block Copolymer | Sulfonic Acid Functionality mol % | Metal Counterion[a] |
|---|---|---|---|
| MA42 | MA4 | 11.0 | Co |
| MA51 | MA5 | 11.9 | Na |
| MA52 | MA5 | 11.9 | Zn |
| MA61 | MA6 | 8.3 | Na |
| MA71 | MA7 | 13.0 | Na |
| MA81 | MA8 | 13.9 | Na |
| MA91 | MA9 | 18.5 | Na |
| MA101 | MA10 | 23.0 | Na |
| MB11 | MB1 | 10.6 | Na |
| MB21 | MB2 | 10.0 | Na |
| MC11 | MC1 | 2.4 | Na |
| MC21 | MC2 | 3.2 | Na |

[a]Assumed to be 100% neutralized.

EXAMPLE 7

Effect of Sulfonation Level on Glass Transition Temperatures

The effect of sulfonation level on the glass transition temperatures of the hydrogenated polybutadiene (EB) and polystyrene (S) phases is demonstrated in Table 4. An increase in the polystyrene Tg is observed upon sulfonation. At higher sulfonation levels, the polystyrene Tg becomes less pronounced. However, the dynamic modulus of the sulfonated elastomer at 200° C. is appreciably higher when compared to the unfunctionalized material. The absence of a distinct Tg suggests either incomplete phase separation or the existence of a large distribution of relaxation times associates with the endblock polymer chains.

TABLE 4

| Polymer Sample | Metal Counterion | Mol % Sulfonate | Glass Transition Temperature (°C.) | |
|---|---|---|---|---|
| | | | EB | S |
| A | — | — | −42 | 110 |
| MA21 | Na | 5.2 | −38 | 115 |
| MA22 | Zn | 5.2 | −38 | 115 |
| MA51 | Na | 11.9 | −38 | 130–150* |
| MA52 | Zn | 11.9 | −38 | 130–150* |

*No distinct tan delta peak observed in DMA profile.

The increase in the polystyrene Tg as well as the retention of dynamic mechanical integrity to higher temperatures may be attributed to ion pair associations which exist within the polystyrene domain due to the presence of the sulfonic acid or sulfonate groups. These ionic interactions restrict molecular mobility of the polystyrene phase which, in turn, alters the dynamic mechanical response of the polymer. The nature of the counterion appears to have little influence on the dynamic mechanical response at a given sulfonation level. This result is in contrast to data on sulfonated polystyrene which shows a correlation between counterion and polymer performance.

EXAMPLE 8

Effect of Temperature, Sulfonate Content, and Sulfonate Groups on Tensile Strengths The effect of temperature, sulfonate content, and sulfonate groups on the tensile properties at room temperature and several elevated temperatures has been investigated. The tensile strengths to break for the ($\sigma_b$) for the unfunctionalized and functionalized samples at different temperatures and sulfonate concentrations are summarized in Table 5. Little variation in tensile strengths between the functionalized and unfunctionalized elastomers are observed at room temperature. At a testing temperature of 100° C., the tensile strength increases as the mole % of sulfonic acid or sulfonate groups present in the polymer increases. Ion pair associations which develop between the sulfonate groups within the endblock appear to inhibit deformation of the hard phase. Hence, mechanical integrity at elevated temperatures is enhanced.

The tensile strengths of the sulfonated block copolymers appear to increase for increasing amounts of sulfonate functional groups. The preferred metal ions is zinc which exhibits highest tensile strength at the elevated temperature.

TABLE 5

Effect of Temperature, Sulfonate Content, and Sulfonate Groups on Tensile Strengths

| Polymer Sample | Functionality, Mol %[a] | Tensile Strength, (psi) | | | | |
|---|---|---|---|---|---|---|
| | | @23° C. | @75° C. | @100° C. | @150° C. | @200° C. |
| A | SEBS (Control) | 4140 | 243 | 150 | 52 | 22 |
| | —SO3H | | | | | |
| MA1 | 2.5 | 4050 | — | 156 | 55 | 25 |
| MA2 | 5.2 | 4100 | 660 | 175 | 65 | 50 |
| MA3 | 8.7 | 4000 | — | 290 | 114 | 65 |
| MA5 | 11.9 | 4000 | 782 | 380 | 160 | 90 |
| | —SO3Na | | | | | |
| MA11 | 2.5 | 4000 | — | 160 | 65 | 26 |
| MA21 | 5.2 | 4000 | 485 | 180 | 87 | 52 |
| MA31 | 8.7 | 4030 | — | 320 | 145 | 80 |
| MA51 | 11.9 | 4050 | 725 | 430 | 250 | 125 |
| | —SO3Zn | | | | | |
| MA12 | 2.5 | 4060 | — | 210 | 85 | 46 |
| MA22 | 5.2 | 4080 | 650 | 250 | 150 | 95 |
| MA32 | 8.7 | 4050 | — | 400 | 290 | 180 |
| MA52 | 11.9 | 4100 | 1100 | 490 | 400 | 260 |

[a]Partial decomposition of 18% functionalized sample occurred during compression molding except for —SO3Zn which exhibited significantly reduced low temperature tensile strength and high temperature strength that exceded the 5.2% —SO3Zn.

As is evident from Table 5, increasing the degree of sulfonate functionality results in a dramatic improvement in the tensile strength of the modified block copolymer at high temperatures. Thus, by incorporating more ionic crosslinking species in the alkenyl arene segment, the mechanical integrity of the individual alkenyl arene domain is enhanced which translates into improved tensile properties at elevated temperatures. These results are consistent with the belief (hat selective functionalization of the alkenyl arene blocks with sulfonate functional groups promotes improved performance.

EXAMPLE 9

Effect of Excess Neutralization on Tensile Strengths

In this example, the tensile strengths oi solution cast films of the sulfonated block copolymer (base Polymer MA2) having neutralization reagents of 100% and 200% (100% excess) basis sulfonate were measured at various temperatures. Results are reported in Table 6.

As is readily apparent from Table 6, the high temperature tensile strength of the zinc acetate neutralized materials was enhanced as the degree of neutralization reagent (metal sulfonate salt content) was increased to an excess of 100%. On the other hand, the mechanical properties were diminished by excess sodium acetate.

TABLE 6

Effect of Excess Neutralization on Mechanical Properties of Sulfonated (5.2 mol %) Block Copolymer MA2

| | Neutralization, % Basis Sulfonate | | | |
|---|---|---|---|---|
| | 100% Na | 200% Na* | 100% Zn | 200% Zn |
| Tensile Strength, psi | | | | |
| Room Temp. | 4,000 | 270 | 4,080 | 4,100 |
| 100° C. | 180 | 114 | 250 | 305 |
| 100% Modulus, psi | | | | |
| Room Temp. | 330 | 190 | 355 | 380 |
| 100° C. | 195 | <100 | 200 | 210 |

*One sample prepared with Sodium Acetate resulted in non-uniform film-white spots. Repeat experiments that eliminate the white spots may give substantially improved properties.

EXAMPLE 10

Effect of Counterion on Tensile Strength

In this example the tensile strengths of solution cast films of the sulfonated block copolymers MA4 and MA5, 100% neutralized with the counterions Pb, Co, Na, and Zn, were measured at various temperatures.

Table 7 depicts the minimal effect of different counterions on the tensile strength of the respective materials at room temperature. The effect is more pronounced at the elevated temperature. Again, the zinc sulfonate modified block copolymer exhibits the highest strength to break at 100° C. compared to lead sulfonated and cobalt sulfonated modified block copolymers.

TABLE 7

Effect of Different Counterions on Mechanical Properties of Sulfonated Block Copolymers MA4 and MA5

| | Mol % Sulfonate | | | |
|---|---|---|---|---|
| | MA52 11.9% —SO$_3$Zn | MA51 11.9% —SO$_3$Na | MA41 11% —SO$_3$Pb | MA42 11% —SO$_3$Co |
| Tensile Strength, psi | | | | |
| Room Temp. | 4,100 | 4,050 | 4,050 | 4,000 |
| 100° C. | 490 | 430 | 415 | 390 |
| 100% Modulus, psi | | | | |
| Room Temp. | 370 | 350 | 375 | 345 |
| 100° C. | 240 | 235 | 250 | 205 |

EXAMPLE 11

Effect of Sulfonation Reagent on Performance of Sulfonated Block Copolymers

Table 8 compares the concentrations and properties of the sodium neutralized block copolymers of the present invention with a sodium neutralized block copolymer sulfonated with SO$_3$ triethylphosphate, as taught by U.S. Pat. No. 3,577,357, and with the non-sulfonated block copolymer.

TABLE 8

| Sulfonation Reagent | Polymer Sample | Mol % —SO$_3$Na | Tensile Strength (psi) | |
|---|---|---|---|---|
| | | | 80° C. | 100° C. |
| Unsulfonated Control | B | 0 | 200 | 150 |
| SO$_3$ Triethylphosphate | MB21 | ≈10 | 500 | |
| Acetyl Sulfate | MB11 | 10.6 | 1600 | |
| Acetyl Sulfate | MA51 | 11.9 | | 430 |

The tensile strengths shown in Table 8 establish that the sulfonated block copolymers prepared with acetyl sulfate are substantially superior to both the unsulfonated block copolymer and the sulfonated block copolymer prepared with SO$_3$/triethylphosphate. Although there is insufficient structural information on the sulfonated block copolymers to establish structural differences for sulfonation with acyl sulfates vs. SO$_3$/triethylphosphate, it is clear from the tensile data that the resulting structures differ.

EXAMPLE 12

Compression Set Data

Compression set was measured for two of the polymer samples, a sulfonated modified block copolymer and the base block copolymer, as indicated in Table 9.

TABLE 9

| | COMPRESSION SET | | | |
|---|---|---|---|---|
| | Sulfonate Functionality | | Compression Set (%) | |
| Block Copolymer | mol % | Counterion | RT | 100° C. |
| A (Control) | — | — | 25 | 100 |
| MA61 | 8.3 | Na$^+$ | 35 | 35 |

The sodium sulfonated block copolymer exhibited significantly improved compression set at the elevated temperature. Further, the compression set of the sulfonated block copolymer was not temperature dependent for the measurements at room temperature and at 100° C. These results establish that incorporating ionic cross-links in the alkenyl arene segment imparts improved resistance to compressive deformation at elevated temperatures.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A selectively sulfonated, selectively hydrogenated block polymer which is produced by the process of:
    reacting acetyl sulfate and a block copolymer in a solvent, each block copolymer molecule having at least two alkenyl polymer blocks A and at least one substantially completely hydrogenated conjugated diene block B, whereby sulfonic acid functional groups are primarily grafted to the block copolymer on the A blocks, and
    recovering the grafted block copolymer from the solvent, wherein:

the block copolymer has two A blocks, each A block prior to hydrogenation is predominantly polymerized styrene units, the block copolymer has one B block positioned between the two A blocks, the B block prior to hydrogenation is predominantly polymerized butadiene units, the block copolymer has a number average molecular weight of 50,000 with said A blocks constituting 30 percent by weight of said copolymer prior to sulfonation, the residual ethylenic unsaturation of said B block after hydrogenation is less than about 2 percent of the ethylenic unsaturation of said B block prior to hydrogenation, the residual aromatic unsaturation of said A blocks after hydrogenation is greater than 95 percent of the aromatic unsaturation of said A blocks prior to hydrogenation, and the block copolymer contains 1 sulfonic acid group per 9 styrene units and the sulfonic acid groups are neutralized to sulfonate salts with sodium ions.

2. The sulfonated block copolymer according to claim 1, wherein said B blocks have a 1,2 content of between about 35 percent and about 55 percent.

* * * * *